June 8, 1937. J. D. McKIERNAN 2,082,967
APPARATUS FOR CUTTING SWINGING BEVELS
Filed Aug. 16, 1935 2 Sheets-Sheet 1

INVENTOR
James D. McKiernan
BY
ATTORNEY

June 8, 1937.  J. D. McKIERNAN  2,082,967
APPARATUS FOR CUTTING SWINGING BEVELS
Filed Aug. 16, 1935  2 Sheets-Sheet 2
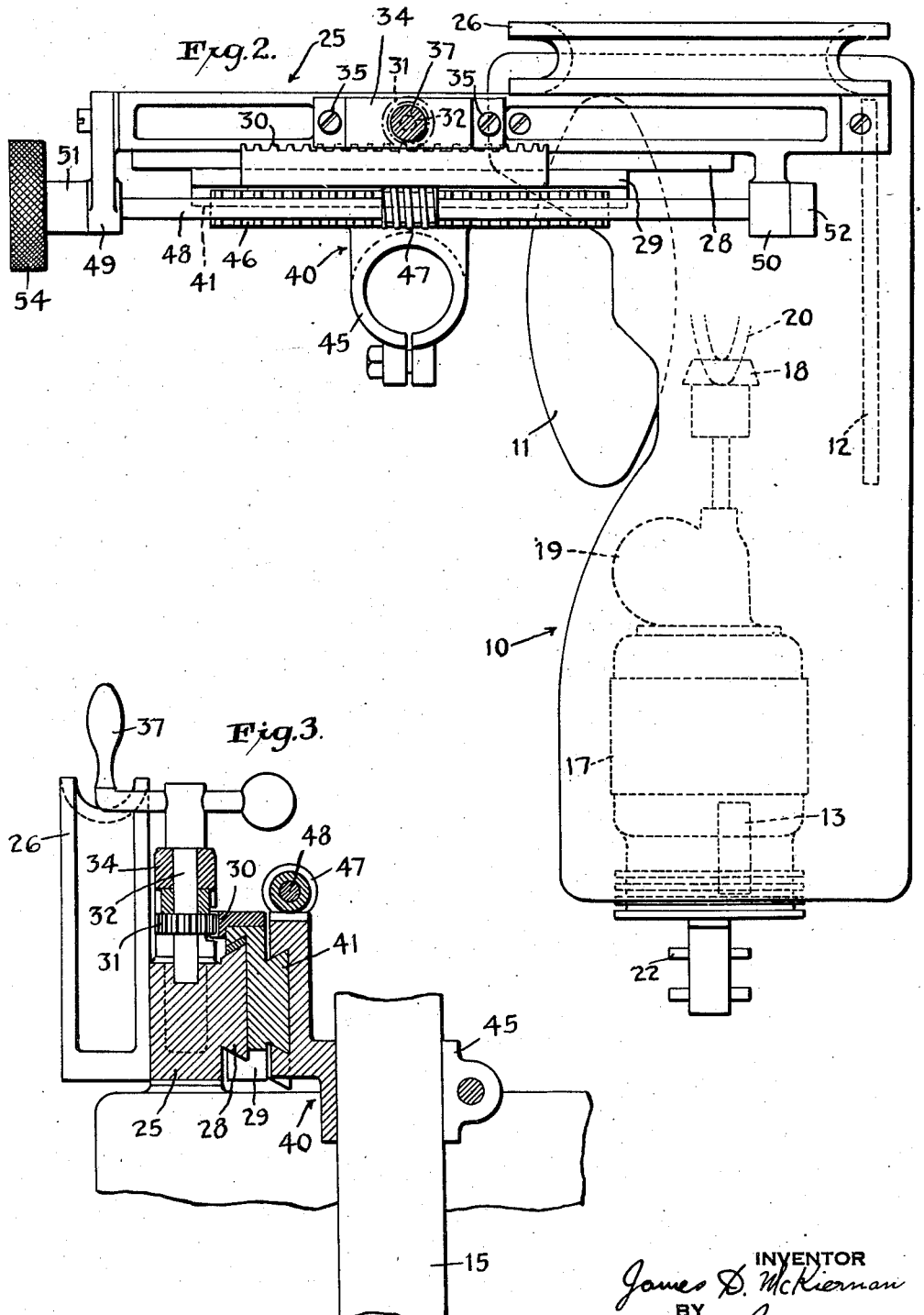
INVENTOR
James D. McKiernan
BY
ATTORNEY Patented June 8, 1937

2,082,967

UNITED STATES PATENT OFFICE 2,082,967

APPARATUS FOR CUTTING SWINGING BEVELS

James D. McKiernan, Brooklyn, N. Y., assignor to Air Reduction Company, Incorporated, New York, N. Y., a corporation of New York Application August 16, 1935, Serial No. 36,506

8 Claims. (Cl. 266—23)

This invention relates to oxygen cutting apparatus, and to apparatus for connecting a cutting torch with the means for supporting it over the surface of the work. Although primarily intended for self-propelled torch carriages with wheels running on the work or other surface, the invention is not limited to such carriages and in its broader aspects relates to any kind of supporting means for holding the torch while effecting relative movement of the torch and work.

It is an object of this invention to provide means for holding a torch in position to make vertical or bevel-edge cuts and for shifting the torch during the cutting operation to produce a cut having a "swinging bevel", that is, a progressive change in the angle of the edge face with respect to the surface of the work. Such a change in the slope of a torch does not necessarily make the edge cut a warped surface, because the change in the position of the torch may be necessary in order to counteract a change in the slope of the surface of the work. For example, when cutting hatchways in the deck of a ship, it is necessary to change progressively the slope of the torch with respect to the deck in order to make the sides of the hatchway actually vertical at all points.

Another object of the invention is to provide a torch holder which can be conveniently adjusted to cut different bevels without requiring a change in the position of the torch-holder with respect to its supporting means. In utilizing this feature of the invention the torch-holder may be adjusted before starting the cut and the bevel or vertical edge cut by the torch kept the same during the cut.

Other objects, features and advantages of the invention will appear or be pointed out as the specification proceeds.

In the accompanying drawings, forming part hereof:

Fig. 2 is a top plan view, on a slightly reduced scale, of the structure shown in Fig. 1, with the slide adjusting shaft shown in section and the torch removed; and Fig. 3 is a sectional view on the line 3—3 of Fig. 1.

Figure 1:
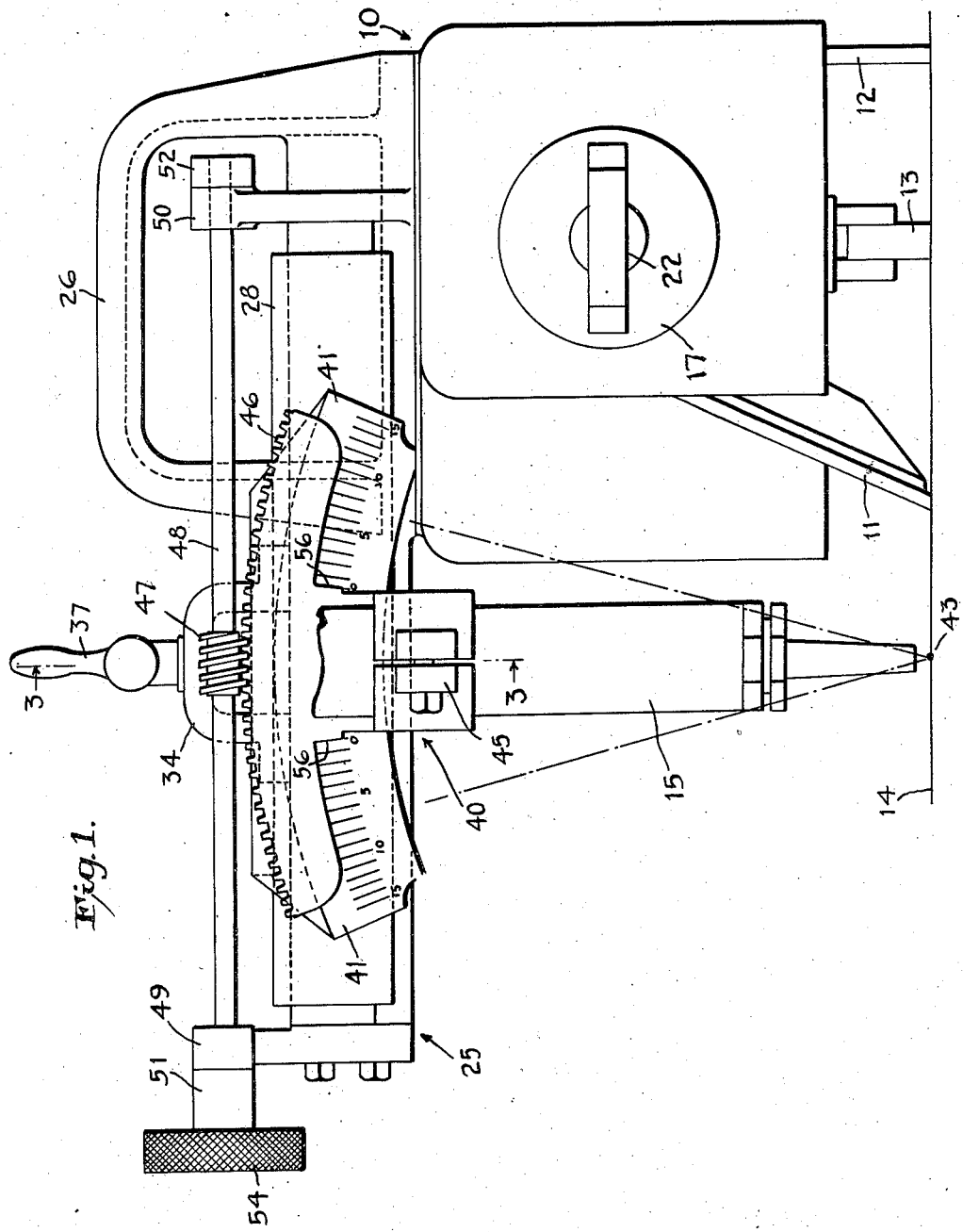
Fig. 1 is an end elevation of a portable torch carriage equipped with apparatus for cutting swinging bevels in accordance with this invention.

A self-propelled torch carriage 10 has a driving wheel 11 and idler wheels 12 and 13 for stably supporting it on the work 14 or other surface. The driving wheel 11 slopes outward toward the bottom and is dished to enable the torch 15 to be located close to the point of traction of the carriage in order to avoid large variations in torch speed when the carriage makes sharp turns and in order to keep the path of the torch as nearly similar as possible to the path of the traction wheel. On straight-line work, or curves where the template or pattern has been designed for a certain spacing of the torch and driving wheel, it is of no advantage to locate the torch close to the point of traction, and the torch 15 is not shown adjusted for such work in the drawings.

The idler wheel 12 turns about an axis which is fixed with respect to the carriage but in the same plane with the axis of rotation and point of traction of the driving wheel 11 so that the idler wheel 12 does not interfere with the free turning movement of the carriage 10. The idler wheel 13 which supports the rearward end of the carriage is a caster wheel and swivels freely to permit the carriage to be turned in any direction.

The torch carriage 10 is driven by a motor 17. This motor drives a bevel gear 18 through reduction gearing 19, and the gear 18 meshes with a gear 20 secured to the axle of, or directly to, the traction wheel 11. The speed of the motor 17 is controlled by a governor 22.

The invention is not limited to any particular type of torch support, and in so far as the broader aspects of the invention are concerned the carriage shown in the drawings is representative of means for supporting a torch for relative movement with respect to the work.

A frame 25 is fastened to the top of the carriage 10 near the forward end and extends for some distance beyond the driving wheel side of the carriage. An upstanding portion of the frame 25 forms a handle 26 for picking up the carriage or for aid in steering it.

A dovetail bearing 28 along the back of the frame 25 supports a slide 29. A rack 30 is fastened to the slide 29 and meshes with a pinion 31 fixed on a shaft 32. The lower end of the shaft 32 is journaled in the frame 25, and the upper portion of this shaft extends through a bearing in a bracket 34 fastened to the frame 25 by screws 35. A handle 37 connected to the top of the shaft 32 is used to turn the shaft 32 and pinion 31 when the slide 29 is to be moved along the dovetail bearing 28.

A torch-holder 40 is supported by the slide 29 on a dovetail bearing 41. This bearing 41 is curved in a vertical plane, as shown in Fig. 1, about a point 43 on the surface of the work 14. The torch-holder has a complementary bearing slidable along the arcuate bearing 41.

The rearward part of the torch-holder 40 is a split clamp 45, and grips the body of the torch 15. A gear segment 46 on the torch-holder is engaged by a worm 47 fixed on a shaft 48. The worm 47 is a single thread worm and the gearing comprising the segment 46 and worm 47 is therefore irreversible. This feature of the invention makes it unnecessary to provide clamping means for holding the torch and its holder in set position because unbalanced weight of the torch can not rotate the worm, and the inclination of the torch can not change without rotating the worm.

Bearings 49 and 50, which are part of the frame 25, support the shaft 48, and collars 51 and 52 at the opposite ends of the shaft hold it against endwise movement. There is a handle or knob 54 connected with one end of the shaft 48 for turning it to rotate the worm 47 and cause it to shift the torch-holder to change the angle of the torch with respect to the work.

The dot-and-dash lines on either side of the torch 15 in Fig. 1 indicate the position of the center line of the torch when tipped to its limit of movement on both sides of the vertical. A scale on the back face of the slide 29 is graduated for use with the side edges 56 of the torch-holder as indicators to designate the angle of inclination of the torch for all positions of the torch-holder.

As the carriage moves along the work or other supporting surface, the attendant controls the angle of the bevel cut by turning the knob 54 to rotate the worm 47 and operate the gear segment 46 to alter the inclination of the torch. The worm gearing between the knob 54 and torch-holder 40 gives the attendant a large mechanical advantage so that a substantial movement of the knob moves the torch-holder very little. This makes possible very accurate adjustment of the position of the torch-holder.

The illustrated embodiment of the invention will cut bevels of any slope between fifteen degrees inclination to the right or left, and zero inclination or vertical wall cuts.

The invention is not limited to any particular range of angles or type of torch carriage, and various changes and modifications may be made without departing from the invention as defined in the claims.

I claim:

1. Metal cutting apparatus including a carriage with a plurality of wheels for stably supporting it on the surface of the work, a torch-holder supported by the carriage, an oxygen cutting torch in said holder, a handle, and mechanism operated by said handle for producing movement of the torch-holder with respect to the carriage, said mechanism including means to prevent its operation by the weight of the torch or holder and being constructed and arranged to change the inclination of the torch while it remains directed at substantially the same point on the work.

2. A machine for cutting swinging bevels comprising a torch-holder, a support for moving the torch-holder including a carriage with a plurality of wheels stably supporting it on the surface of the work, and manually operable means for causing the inclination of the torch-holder to change laterally of the direction of movement of the carriage and about a center substantially on the surface of the work while a torch carried in said holder is making a cut whereby the angle of the sides of the cut with respect to the surface of the work varies along the length of the cut.

3. The combination with a self-propelled torch carriage having wheels for supporting it on the surface of the work, of a torch-holder connected with the carriage, and a device operable during a cutting operation to cause the torch to tilt laterally to change the angle of the cut with respect to the surface of the work while maintaining the lateral spacing of the cut from the carriage substantially unchanged.

4. Metal cutting apparatus comprising a self-propelled torch carriage having wheels for supporting it on the work or other surface, including a single driving wheel, a cutting torch, a holder for supporting the torch from the carriage in a position with the torch tip near the driving wheel, means for moving the torch-holder to shift the torch closer to or further from the driving wheel, and other means for tilting the torch-holder to change the inclination of the torch, laterally of the direction of travel of the carriage, said other means including a bearing having a center of curvature adjacent the tip of the torch so that the tip end remains at a substantially constant distance from the driving wheel during changes in the lateral inclination of the torch.

5. Apparatus for cutting swinging bevels including a carriage with a plurality of wheels for stably supporting it on the surface of the work, a torch-holder, a frame for connecting the torch-holder with the carriage, a bearing surface between the torch-holder and frame curved in a plane extending laterally of the direction of movement of the carriage and about a center close to the surface of the work, and adjustment means for causing a change in the position of the torch-holder along said bearing while the carriage is moving across the surface of the work.

6. Apparatus for cutting swinging bevels including a torch-holder, a frame for connecting the torch-holder with a support, an arcuate bearing surface on the frame having a curvature in a substantially vertical plane about a point corresponding approximately with the level of the work, a complementary bearing surface on the torch-holder slidable along the bearing surface on the frame, a handle for sliding the torch-holder along said bearing surface on the frame, and motion transmitting connections between the handle and the holder, said connections including irreversible gearing whereby the torch-holder is held in set positions, and accurate adjustments of the inclination of the torch-holder can be effected.

7. Torch cutting apparatus including in combination a support movable over the surface of the work, a frame slidable along said support, a torch-holder connected with the frame and movable with respect to the frame on a curved bearing having a center of curvature substantially on the surface of the work, a worm wheel segment connected with the torch-holder and having the center of the segment substantially coincident with that of the bearing, a worm meshing with the segment and secured to a shaft carried by said support, and means for turning the shaft to operate the worm gearing and change the inclination of the torch-holder.

8. Torch cutting apparatus including in combination a support movable over the surface of the work, a frame carried by said support, rack and pinion mechanism for moving the frame along said support, an arcuate bearing on the frame with a center of curvature substantially at the surface of the work, a torch-holder connected to the frame and movable thereon along said arcuate bearing to change the inclination of a torch carried by said holder without making any substantial change in the location of the point at which a cutting jet from the torch strikes the work, a worm wheel segment curved about substantially the same center as the arcuate bearing, a shaft journaled in said support, a worm fixed on the shaft in position to mesh with the worm wheel segment, and manually operated means for turning the shaft to operate the worm gearing and change the inclination of the torch-holder and the torch carried by said holder while said support moves over the surface of the work whereby the bevel edge cut by the torch changes its angle with the surface of the work progressively along the length of the cut.

JAMES D. McKIERNAN.